United States Patent
Ichino

(12) 
(10) Patent No.: US 6,353,710 B1
(45) Date of Patent: Mar. 5, 2002

(54) LENS BARREL

(75) Inventor: Kazushige Ichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/507,797

(22) Filed: Feb. 22, 2000

(30) Foreign Application Priority Data

Feb. 26, 1999 (JP) .......................................... 11-051245

(51) Int. Cl.[7] .......................... G03B 17/00; G03B 5/02; G03B 17/04; G02B 15/14
(52) U.S. Cl. .......................... 396/83; 396/349; 359/700
(58) Field of Search .................... 396/72, 348, 349, 396/75, 85, 83; 359/699, 700, 701

(56) References Cited

U.S. PATENT DOCUMENTS

| | | | | |
|---|---|---|---|---|
| 4,993,815 A | * | 2/1991 | Yamazaki et al. | 350/429 |
| 5,329,329 A | * | 7/1994 | Fukushima et al. | 354/195.12 |
| 5,510,868 A | | 4/1996 | Nomura et al. | 354/208 |
| 5,598,241 A | * | 1/1997 | Nomura et al. | 396/79 |
| 5,602,607 A | * | 2/1997 | Kato et al. | 396/349 |
| 5,659,810 A | * | 8/1997 | Nonura et al. | 396/72 |
| 5,701,523 A | * | 12/1997 | Omiya et al. | 396/83 |
| 5,912,772 A | * | 6/1999 | Aoki | 359/701 |
| 6,049,432 A | * | 4/2000 | Machida et al. | 359/700 |
| 6,061,524 A | * | 5/2000 | Uno | 396/83 |
| 6,101,335 A | * | 8/2000 | Onda | 396/83 |
| 6,278,844 B1 | * | 8/2001 | Takeshita | 396/85 |

FOREIGN PATENT DOCUMENTS

EP  0 704 736 A2  4/1996

* cited by examiner

*Primary Examiner*—Christopher E. Mahoney
(74) *Attorney, Agent, or Firm*—Robin, Blecker & Daley

(57) ABSTRACT

A lens barrel includes a cam tube having a female helicoid and a cam formed in an inner wall thereof. A first tube which holds a lens and has a male helicoid formed on an outer wall thereof engages the female helicoid. The first tube is arranged to be moved in an optical axis direction by rotation of the cam tube. A lens holding member holds a lens and has a cam pin provided thereon for engaging the cam of the cam tube. The lens holding member is arranged to be moved in the optical axis direction by a cam action of rotation of the cam tube. The female helicoid and the cam of the cam tube respectively have loci which are continuous and uninterrupted without interfering with each other.

12 Claims, 9 Drawing Sheets

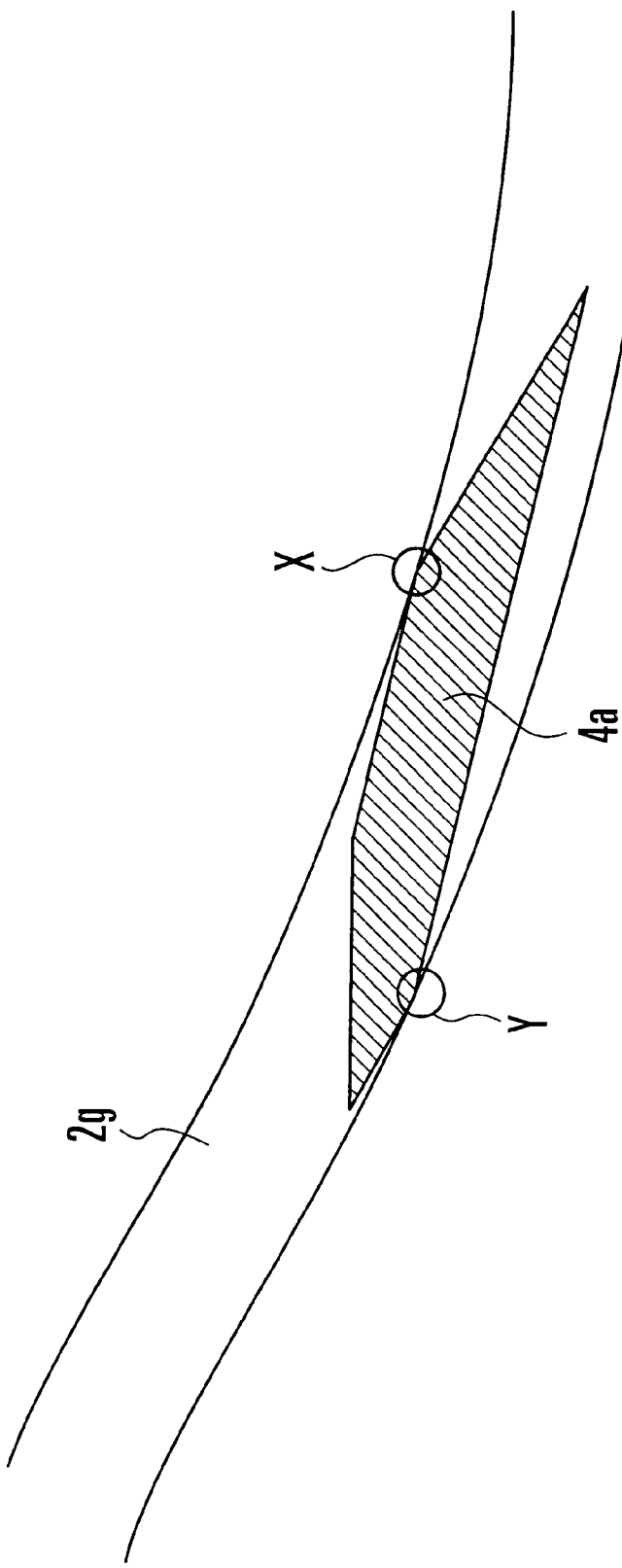

LENS BARREL

BACKGROUND OF THE INVENTION

1. Field of the Invention

The present invention relates to a lens barrel adapted for a camera or the like, and more particularly to a so-called differential-type lens barrel arranged to permit reduction in diameter of the whole lens barrel by reducing the thickness of a differential tube.

2. Description of Related Art

Zoom lens barrels of the kind having a cam pin, a cam groove and a rectilinear motion guide member have heretofore been variously arranged.

Meanwhile, a lens barrel disclosed in Japanese Laid-Open Patent Application No. HEI 3-209445 is arranged to use a helicoid in place of the cam pin and the cam groove. In the case of this lens barrel, a front lens unit is provided with a male helicoid and a rear lens unit is provided with a cam pin, while a cam tube is provided with a female helicoid and a cam groove for guiding and holding the two lens units. These parts are arranged to permit the lens barrel to be drawn out by using the cam tube.

In this lens barrel, the front lens unit which is arranged to be guided by the helicoid mechanism is guided through a single lead screw. The front lens unit, therefore, linearly moves while the cam tube is rotating. However, if the cam groove of the cam tube is formed to have such a locus that enables the rear lens unit being guide by the cam groove to satisfy an optical condition and a condition for moving into a stowage state, the front lens unit makes a nonlinear motion in relation to the rotation of the cam tube.

In this instance, the cam groove is formed to cross a part of the female helicoid. Therefore, while the cam groove is in a continuous shape, the female helicoid is partly noncontinuous. In other words, in this state, the cam groove which is formed to satisfy the optical loci required for the front and rear lens units and the loci necessary for moving them to their stowage positions interferes with the female helicoid within the cam tube.

To solve this problem, therefore, the lens barrel disclosed in the above-cited Japanese laid-open patent application is arranged to have the positions of the helicoid and the cam groove within the cam tube deviate stepwise from each other in the direction of diameter. This arrangement effectively avoids the above-stated interference, thereby enabling both the helicoid and the cam groove to fulfill their respective functions.

In another lens barrel disclosed in Japanese Laid-Open Patent Application No. HEI 4-347810, a rotating tube is arranged to guide only a front lens unit by helicoid coupling. A cam tube which is disposed inside of the front lens unit is arranged to be rotated by the force of a moving amount of the front lens unit in the direction of an optical axis. The rotation of the cam tube causes a rear lens unit to make a nonlinear motion in relation to the rotation of the rotating tube.

In the case of this lens barrel, a lens barrier is opened and closed by making a zero lead state at a part of the helicoid which is guiding with a single lead (at the time of stowing the lens barrel), i.e., by bringing about a state in which the front lens unit does not move in relation to the rotation of the rotating tube.

In this lens barrel, a helicoid and a cam groove are arranged to have a lead varying at a part. However, since the helicoid and the cam groove are formed in different tubes, they do not interfere with each other, so that the tubes can be arranged without taking heed to each other.

Further, there are many known differential-type zoom lens barrels having a plurality of tubes arranged in such a way as to make the total length of the lens barrel shorter in a stowage state.

The structural arrangement of differential-type zoom lens barrels is advantageous for making the length in the stowage state of the lens barrel shorter. However, since a plurality of tubes are arranged to be in fitting engagement, the diameter of the whole lens barrel becomes large and the projected area of the lens barrel as viewed from the front side of the camera inevitably becomes large. The diameter of the lens barrel can be prevented from becoming large, by decreasing the thickness (dimension in the redial direction) of each of the component tubes. However, the decreased thickness lowers the rigidity and strength of the whole structural arrangement.

With respect to the thickness of a cam tube in a differential-type lens barrel, the thickness determining elements of the cam tube of the lens barrel disclosed in Japanese Laid-Open Patent Application No. HEI 3-209445 include, in sequence from outside, the following three:

(1) A part which is a base of the whole tube.
(2) A cam groove for cam coupling with a cam pin.
(3) A helicoid screw for helicoid coupling.

If the arrangement of the cam tube is changed to perform the drawing-out action totally by cam coupling by rescinding the drawing out by the helicoid coupling, the front lens unit can be nonlinearly moved in relation to the rotation of the cam tube, similarly to the rear lens unit, to avoid any inference taking place within the cam tube. By such modification, the three thickness determining elements can be reduced to the elements (1) and (2) to permit reduction in thickness of the cam tube.

However, compared with the case where a helicoid is used, the number of cam pins necessary for the cam pin arrangement increases. Besides, the cam coupling which has three contact points is weaker in coupling strength than the face-engaging arrangement of helicoid coupling.

As regards the lens barrel disclosed in Japanese Laid-Open Patent Application No. HEI 4-347810, the lens barrel has a helicoid coupling part and a cam coupling part formed in different tubes. In respect of thickness, however, the lens barrel necessitates the thickness determining element (1) at two parts. Therefore, the arrangement of the lens barrel inevitably causes an increase in the diameter thereof.

BRIEF SUMMARY OF THE INVENTION

It is an object of the invention to provide a lens barrel which is arranged to solve the problems of prior art described in the foregoing.

To attain the above object, in accordance with an aspect of the invention, there is provided a lens barrel, which comprises a cam tube having a female helicoid and a cam formed in an inner wall thereof, a first tube which holds a lens and has a male helicoid formed on an outer wall thereof to engage the female helicoid, the first tube being arranged to be moved in an optical axis direction by rotation of the cam tube, and a lens holding member which holds a lens and has a cam pin provided thereon for engaging the cam of the cam tube, the lens holding member being arranged to be moved in the optical axis direction by a cam action of rotation of the cam tube, wherein the female helicoid and the cam of the cam tube respectively have loci which are continuous and uninterrupted without interfering with each other.

Further, in the lens barrel, the female helicoid is a composite female helicoid composed of a first female helicoid part and a second female helicoid part which is formed continuously from the first female helicoid part and has a lead different from a lead of the first female helicoid part, and the male helicoid of the first tube is a composite male helicoid composed of first and second male helicoid parts which are capable of face-engaging the first and second female helicoid parts of the female helicoid.

By virtue of the above-stated arrangement, the cam tube can be compactly formed to satisfy the necessary conditions for both helicoid coupling and cam coupling without increasing the thickness of the cam tube and thus without increasing the diameter of the whole lens barrel.

In the lens barrel, the cam of the cam tube is preferably formed in a rugged, protruding-and-recessed shape alternately and continuously having a part at which the lens holding member is caused to be moved, for example, in the frontward direction of the optical axis and another part at which the lens holding member is caused to be moved in the rearward direction of the optical axis. A part of the cam tube where the first and second female helicoid parts continue to each other is formed in the neighborhood of a part of the cam where the cam has a recessed shape on the side of the female helicoid, so that the cam and the female helicoid can be arranged close to each other without the fear of the interference of them with each other. This arrangement effectively reduces the size of the cam tube in the optical axis direction.

In the lens barrel, the first female helicoid part of the composite female helicoid formed in the cam tube is preferably arranged to move the first tube in such a way as to carry out both a magnification varying action and a focusing action. The second female helicoid part is preferably arranged to move the first tube for an action other than the magnification varying action and the focusing action, such as a lens barrel stowing action, in such a way as to ensure that the lens barrel can be smoothly drawn out through the helicoid coupling in an ordinary zoom driving operation.

Further, in the composite male helicoid formed in the first tube, the first male helicoid part is preferably arranged to have a longer engaging length than that of the second male helicoid part, in such a way as to make the lens barrel have a sufficient strength against external forces in its drawn-out state.

The above and further objects and features of the invention will become apparent from the following detailed description of a preferred embodiment thereof taken in connection with the accompanying drawings.

BRIEF DESCRIPTION OF THE SEVERAL VIEWS OF THE DRAWING

FIG. 9 is a diagram for explaining a case where a lead of a composite helicoid is changed over in an infinite manner.

DETAILED DESCRIPTION OF THE INVENTION

Hereinafter, a preferred embodiment of the invention will be described in detail with reference to the drawings.

Figure 1:
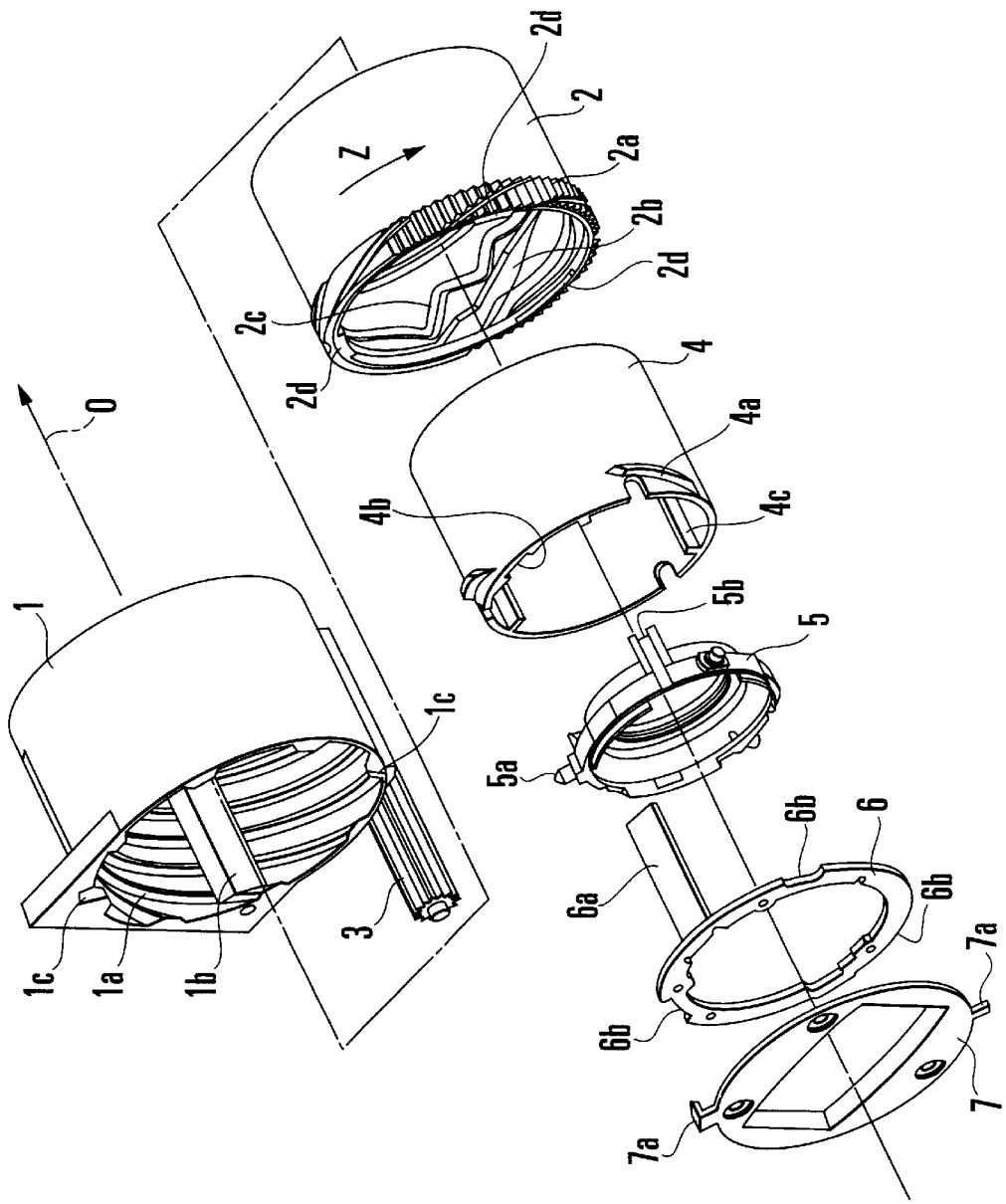
FIG. 1 is an exploded perspective view of a lens barrel according to an embodiment of the invention.
Figure 2:
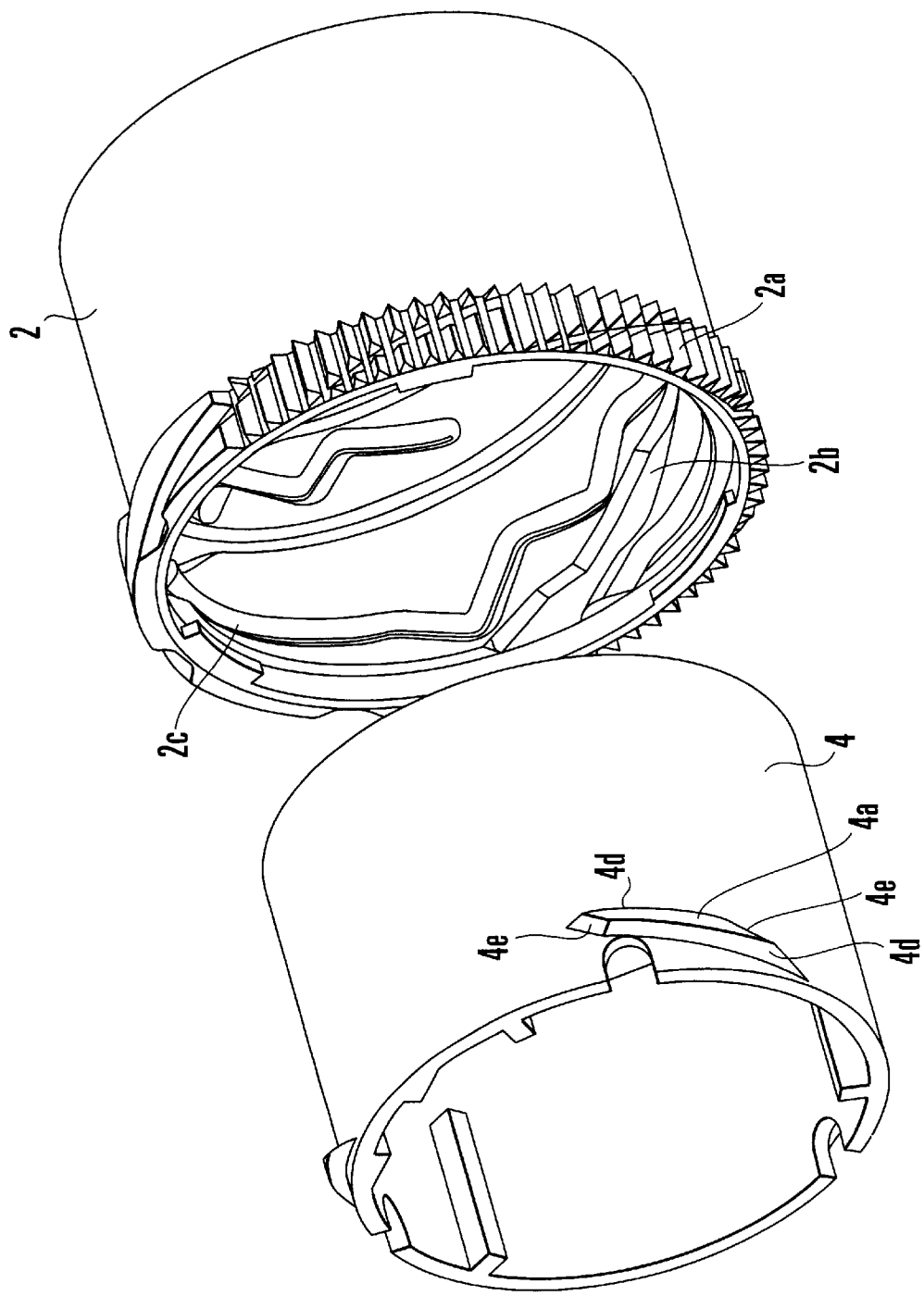
FIG. 2 is an exploded perspective view showing in part the lens barrel.
Figure 3:
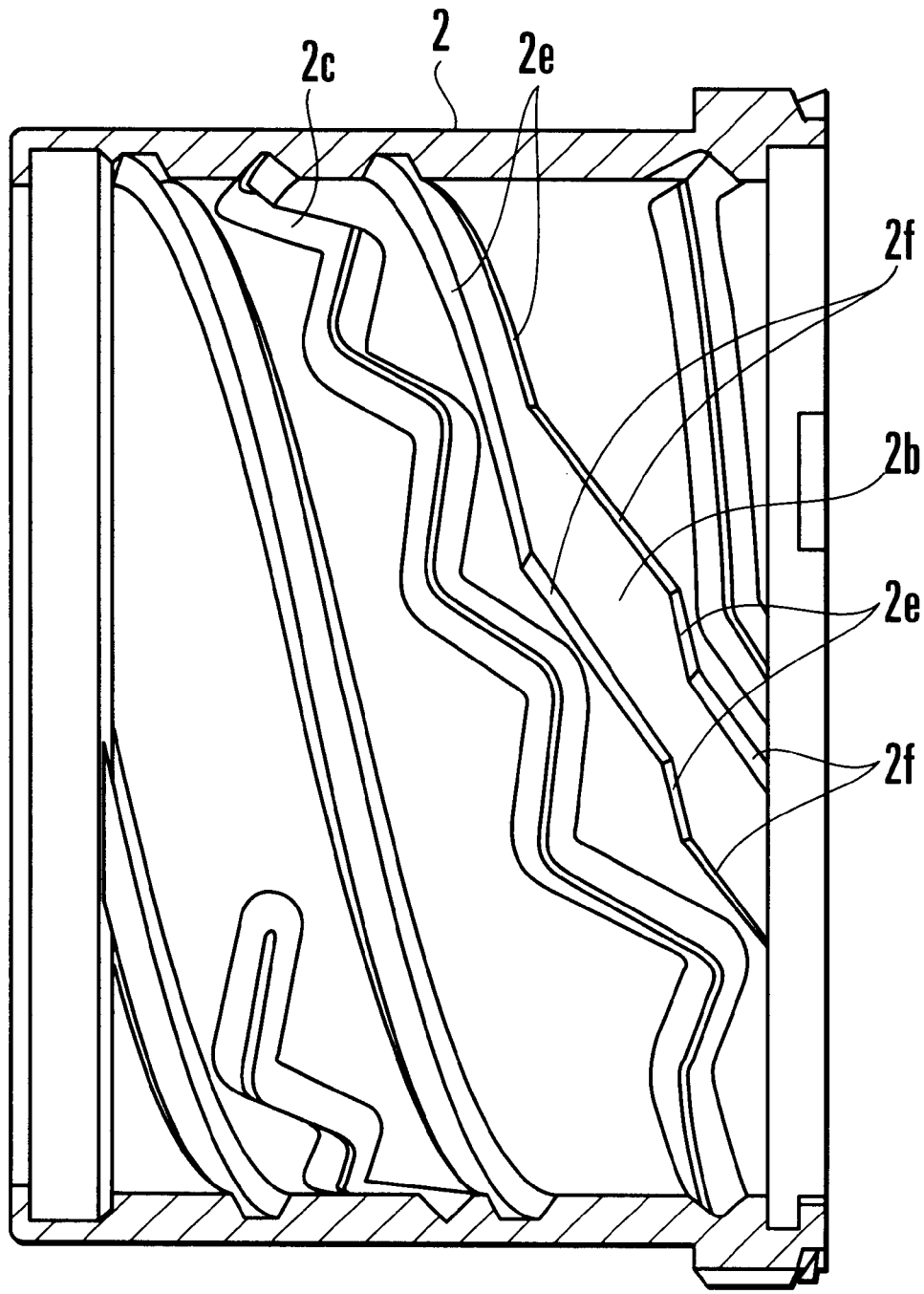
FIG. 3 is a sectional view of a cam tube of the lens barrel taken across a middle part thereof.

FIGS. 1 to 8 show the structural arrangement of a differential-type two-lens-unit zoom lens barrel according to the embodiment of the invention. FIG. 1 is an exploded perspective view showing the zoom lens. FIG. 2 is an exploded perspective view showing only the essential parts of the zoom lens. FIG. 3 is a sectional view showing a cam tube of the lens barrel taken across a middle part thereof. FIGS. 4 to 8 serially show the cam tube while the lens barrel is in process of being drawn out.

The structural arrangement of the whole zoom lens barrel shown in FIG. 1 is first described. In FIG. 1, reference symbol O denotes an optical axis. An arrow on the optical axis O indicates a direction in which an object of shooting is located. A fixed tube 1 is arranged to contain and stow the zoom lens barrel in its entirety. A female helicoid 1*a* is formed on the inner wall of the fixed tube 1. A cam tube 2 has a spur (or flat-toothed) helicoid 2*a* formed on its outer periphery on the side of an imaging plane. The female helicoid 1*a* formed on the inner wall of the fixed tube 1 is helicoid-coupled with a male helicoid included in the spur helicoid 2*a* of the cam tube 2. The cam tube 2 is thus arranged to be movable back and forth in the optical axis direction by a helicoid action while rotating around the optical axis with respect to the fixed tube 1.

A slot 1*b* is formed in one side of the fixed tube 1 to extend in parallel with the optical axis. In the slot 1*b* is inserted a driving gear 3. The driving gear 3 is arranged to be rotated by receiving power from a power transmission system (not shown). A part of the driving gear 3 which protrudes toward the inner side of the fixed tube 1 is in mesh with the flat-toothed part of the spur helicoid 2*a* of the cam tube 2. With the driving gear 3 arranged in this manner, a power is exerted inside of the fixed tube 1 to cause the cam tube 2 to be drawn out in the optical axis direction while being rotated. The cam tube 2 is drawn outward when it is rotating in the direction of an arrow Z and is drawn inward when it is rotating in a direction opposite to the direction of the arrow Z.

A composite female helicoid 2*b* and a cam groove 2*c* are formed on the inner side of the cam tube 2 to hold a front lens unit tube 4 and a rear lens unit tube 5 by coupling with them, respectively. The composite female helicoid 2*b* is formed, unlike the conventional helicoid having a single lead, to include two helicoid parts which are continuously formed in such a way as to have different leads from each other. The details of the composite female helicoid 2*b* will be described later herein. The composite female helicoid 2*b* and the cam groove 2*c* are formed at the same position or at about the same position in the direction of thickness of the circumferential wall, i.e., the diametric direction, of the cam tube 2.

The composite female helicoid 2*b* is formed to move the front lens unit tube 4 along such a locus that satisfies photo-taking optical conditions of a lens held by the front lens unit tube 4 and also along another locus to be taken in moving the front lens unit tube 4 into a stowage state.

The front lens unit tube 4 (a first tube) holds a front lens unit, a shutter mechanism, etc., which are not shown. A composite male helicoid 4a is formed on the outer wall of the front lens unit tube 4 on th e side of the imaging plane. The composite male helicoid 4a is helicoid-coupled with the composite female helicoid 2b of the cam tube 2. Details of the composite male helicoid 4a will be described later herein.

On the inner circumferential side of the front lens unit tube 4, are formed a rectilinear motion groove 4b and three rectilinear motion keys 4c which are equally spaced in the circumferential direction of the front lens unit tube 4. The rectilinear motion groove 4b and the rectilinear motion keys 4c are key-coupled respectively with a rectilinear key ring 6 and a rear lens unit tube 5.

The rear lens unit tube 5 (a lens holding member) holds a rear lens unit which is not shown. Three cam pins 5a are either embedded in or formed integrally with the rear lens unit tube 5 with equal spacing in the direction of circumference. These cam pins 5a are cam-coupled with the cam groove 2c of the cam tube 2.

The cam groove 2c is formed to move the rear lens unit tube 5 along such a locus that permits photo-taking by the combination of the lens held by the rear lens unit tube 5 and the lens held by the front lens unit tube 4 and also along another locus to be taken in moving the rear lens unit tube 5 into a stowage state. Roughly speaking, the cam groove 2c is formed in a rugged shape including a part which causes the rear lens unit tube 5 to move forward in the optical axis direction (for example, a part for a magnification varying action) and another part for causing the rear lens unit tube 5 to move rearward in the optical axis direction (for example, a part for a focusing action). These parts of the cam groove 2c are arranged to alternately continue to and from each other.

The rear lens unit tube 5 is provided with three rectilinear motion grooves 5b which are key-coupled with the rectilinear motion keys 4c of the front lens unit tube 4. This key-coupling arrangement enables the rear lens unit tube 5 to move in the optical axis direction but prevents the rear lens unit tube 5 from rotating around the optical axis.

The rectilinear key ring 6 is arranged within the cam tube 2, in a manner as described below, to be movable in the optical axis direction together with the cam tube 2 but not rotatable around the optical axis.

The rectilinear key ring 6 has a key part 6a extending forward. The key part 6a is key-coupled with the rectilinear motion groove 4b of the front lens unit tube 4. Therefore, the front lens unit tube 4 is movable in the optical axis direction but not rotatable with respect to the fixed tube 1. The rear lens unit tube 5, which is key-coupled with the front lens unit tube 4, is also in the same relation to the fixed tube 1.

The rectilinear key ring 6 is provided with several cutout parts 6b. The cam tube 2 is provided with protruding parts 2d formed in a shape corresponding to the shape of the cutout parts 6a. These parts 6b and 2d are arranged in a bayonet mechanism and can be assembled to engage at a certain rotation phase but not allowed to disengage at any other phases by the bayonet mechanism.

A rectilinear motion guide 7 is mounted with screws on the rear part of the rectilinear key ring 6. The rectilinear motion guide 7 is provided with key parts 7a which protrude outward to be key-coupled with key grooves 1c of the fixed tube 1 which are formed to extend in the optical axis direction. The rectilinear motion guide 7 is thus arranged to be movable in the optical axis direction, although the rectilinear motion guide 7 is not rotatable with respect to the fixed tube 1. The rectilinear motion key ring 6 is thus arranged to be rotatable with respect to the cam tube 2 and also to be movable together with the cam tube 2 in the optical axis direction.

With the lens barrel arranged as described above, when the cam tube 2 is rotated in the direction of the arrow Z, the cam tube 2 is drawn out from the fixed tube 1 while rotating. At the same time, the front lens unit tube 4 and the rear lens unit tube 5 are drawn forward within the cam tube 2 in such a way as to meet predetermined optical conditions for the magnification varying and focusing actions. This makes a camera on which this lens barrel is mounted ready for a photo-taking operation. Further, the fixed tube 1 is either mounted on the camera body or formed integrally with the camera body.

When the cam tube 2 rotates in the direction opposite to the direction of the arrow Z, the cam tube 2 is drawn inward while rotating with respect to the fixed tube 1. Then, a stowing action which is an action other than the magnification varying and focusing actions of the lens barrel can be performed to bring the lens barrel into a stowage state.

Next, the composite helicoid arrangement by which the cam tube 2 and the front lens unit tube 4 are helicoid-coupled with each other is described further with reference to FIGS. 2 and 3 as follows.

Generally, unlike coupling by a cam and a pin, helicoid coupling is effected by causing two faces to engage each other, as mentioned in the foregoing. For ordinary helicoid coupling, a pair of faces to be helicoid-coupled with each other are located in the optical axis direction before and after each other to give a single lead. In the case of the present embodiment, on the other hand, the composite male helicoid 4a (see FIG. 2) is in a rhombic or parallelogram-like shape as viewed from the direction of diameter of the front lens unit tube 4. In this shape, the composite male helicoid 4a has a confronting pair of parallel faces which are first male helicoid faces 4d and another pair of parallel faces which are second male helicoid faces 4e. The first male helicoid faces 4d are arranged to give a first lead and the second male helicoid faces 4e are arranged to give a second lead which is smaller than the first lead. The first helicoid faces 4d are longer than the second helicoid faces 4e in the direction of the circumference of the front lens unit tube 4.

FIG. 3 is a sectional view of the cam tube 2. Referring to FIG. 3, the composite female helicoid 2b has first and second female helicoid faces 2e and 2f which are continuously formed as one female helicoid. The first female helicoid faces 2e are arranged to give the first lead, while the second female helicoid faces 2f are arranged to give the second lead.

As shown in FIG. 3, which is a sectional view, the composite female helicoid 2b is formed on the inner wall of the cam tube 2 to have several bent points (three points in this instance) where the first and second female helicoid faces 2e and 2f become continuous from each other arranged to avoid interference with the cam groove 2c which is formed to satisfy predetermined optical conditions for the rear lens unit tube 5 and also to give a locus required for bringing the rear lens unit tube 5 into a stowage state.

For example, in the composite female helicoid 2b, a continuing point, on the side of the cam groove 2c, between the second female helicoid face 2f which causes the front lens unit tube 4 to move between a stowage position and a wide-angle position and the first female helicoid face 2e which causes the front lens unit tube 4 to move between the wide-angle position and a telephoto position is arranged to be impending over in the vicinity of a part of the cam groove 2c recessed on the side of the composite female helicoid 2b. By this arrangement, the composite female helicoid 2b and the cam groove 2c can be closely arranged without any interference between them for reduction in size of the cam tube 2 in the optical axis direction.

Since the composite female helicoid 2b and the cam groove 2c never interfere with each other, unlike the conventional arrangement, the helicoid and the cam groove do not have to be arranged at different positions in the direction of thickness (diameter) and thus can be regarded as one element. This means that the cam tube 2 can be arranged to have the same thickness as in the case where the front and rear lens unit tubes are arranged to be driven through a cam coupling arrangement.

In other words, according to the arrangement of the present embodiment of the invention, the three cam tube thickness determining elements which have been necessary for the conventional arrangement can be reduced to two. Therefore, the cam tube 2 can be arranged to have a thinner thickness to permit reduction in size of the cam tube 2.

Besides, the arrangement for having the front lens unit tube 4 helicoid-coupled with the cam tube 2 obviates the necessity of having any additional cam pin. The number of necessary parts, therefore, can be lessened. Further, since the front lens unit tube 4 is allowed to be face-engaging the cam tube 2 by the helicoid coupling, the present embodiment excels also in coupling strength.

A drawing-out action and assembly work on the lens barrel using the composite helicoid according to the invention are next described with reference to FIGS. 4 to 8. FIGS. 4 to 8 show the cam tube 2 together with a part of the front lens unit tube 4 in an external-surface developed state. Necessary parts located on their inner surface side are indicated by broken lines. Further, for the sake of reference, the cam pin 5a of the rear lens unit tube 5 which relates to the actions of these parts is also included in these illustrations.

Figure 4:
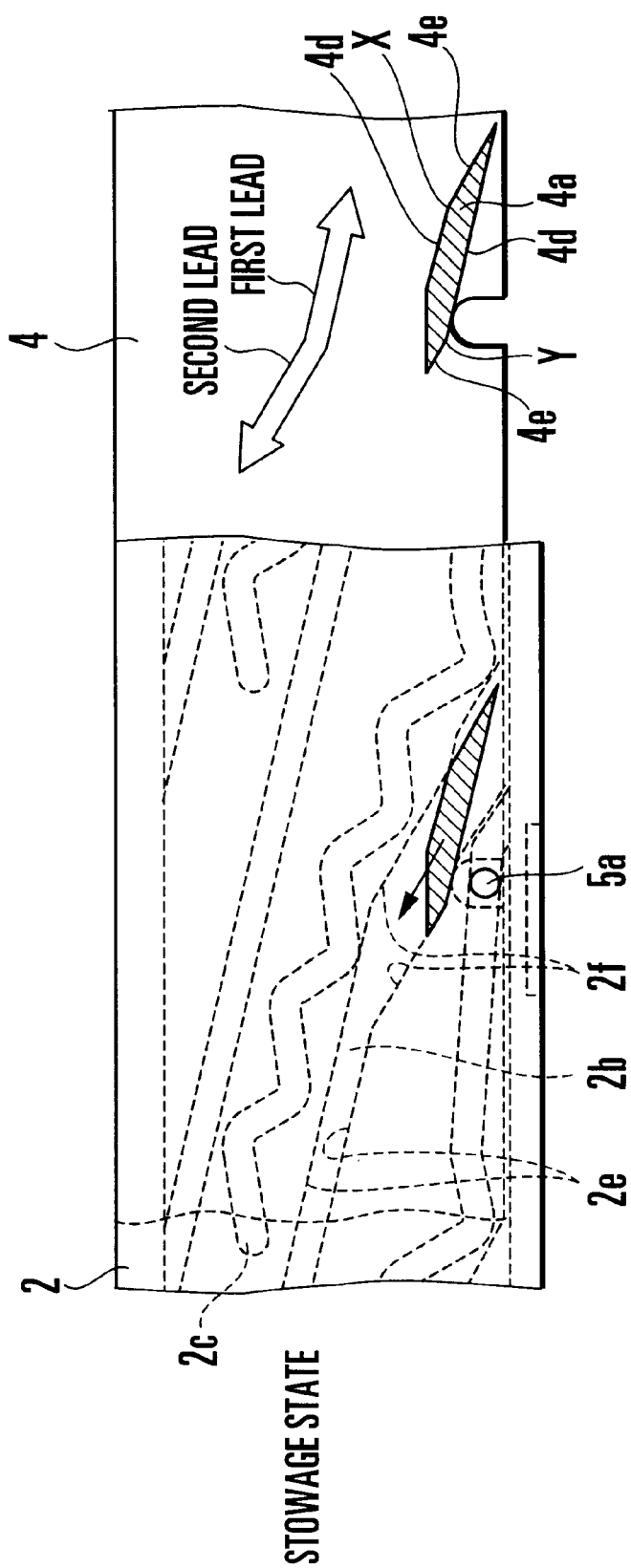
FIG. 4 is a development view showing the cam tube in a stowage state.
Figure 5:
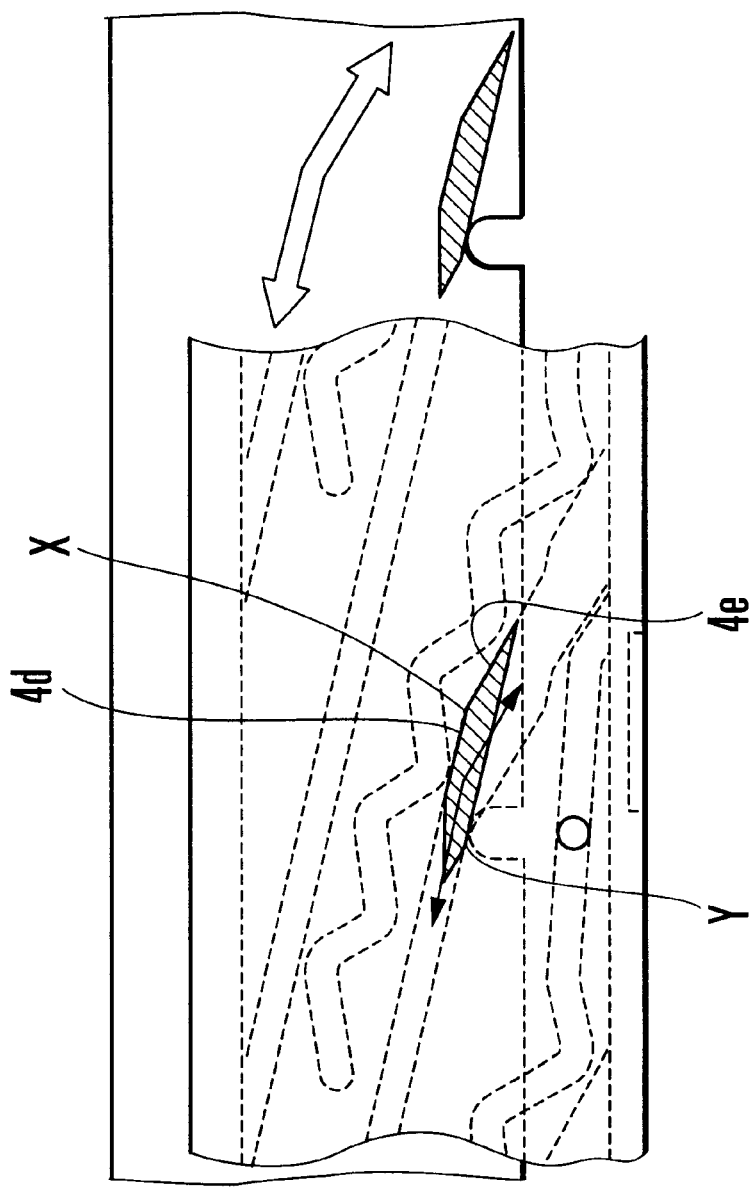
FIG. 5 is a development view showing the cam tube in an intermediate state obtained between the stowage state and a wide-angle setting state.
Figure 6:
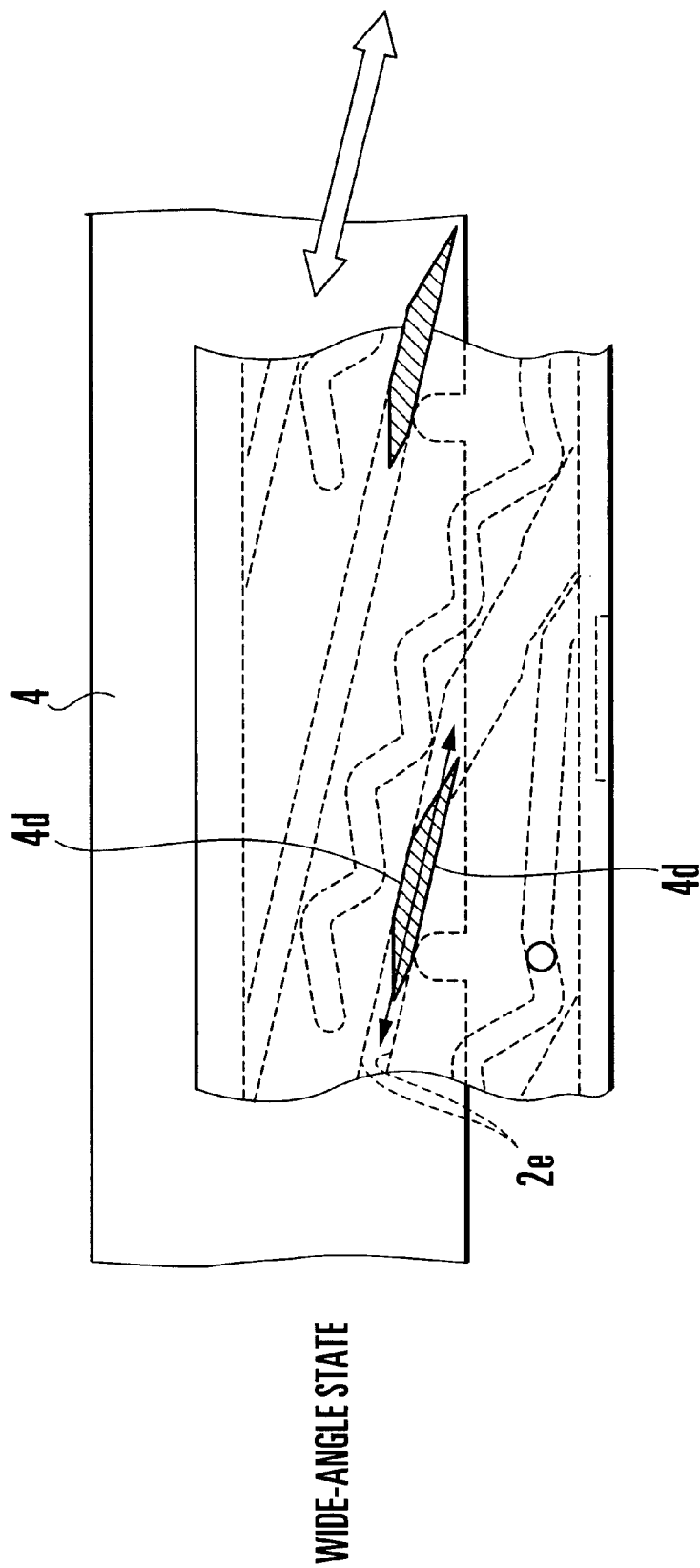
FIG. 6 is a development view showing the cam tube in the wide-angle setting state.
Figure 7:
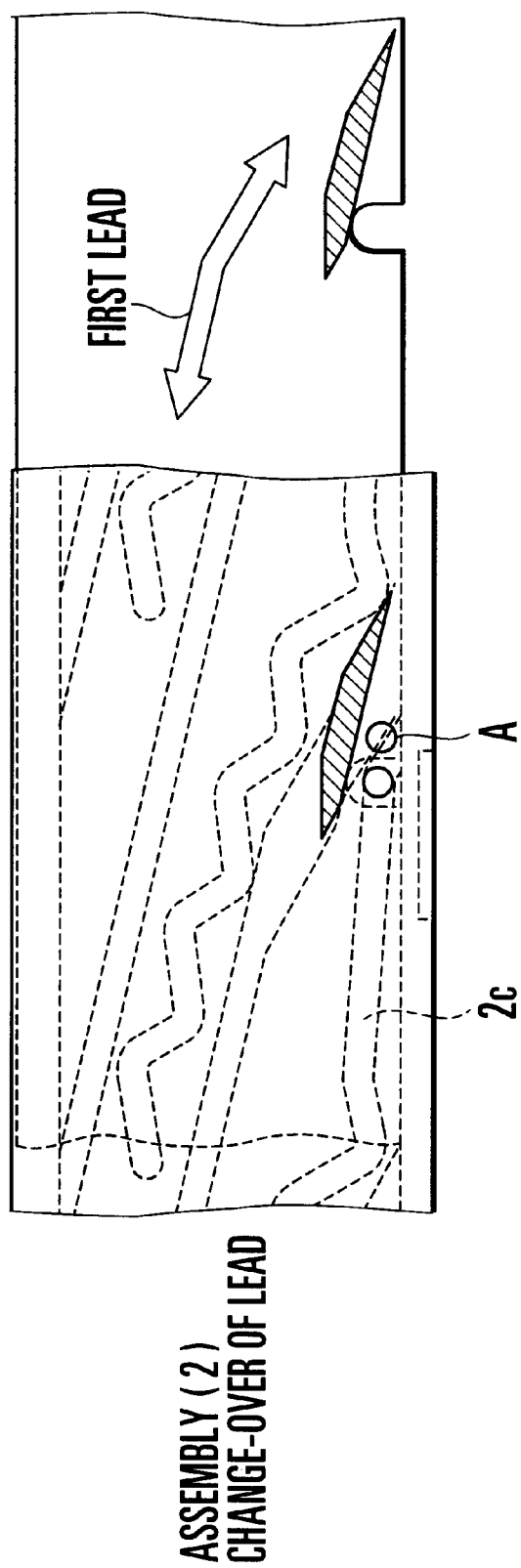
FIG. 7 is a development view showing the cam tube in process of assembly.
Figure 8:
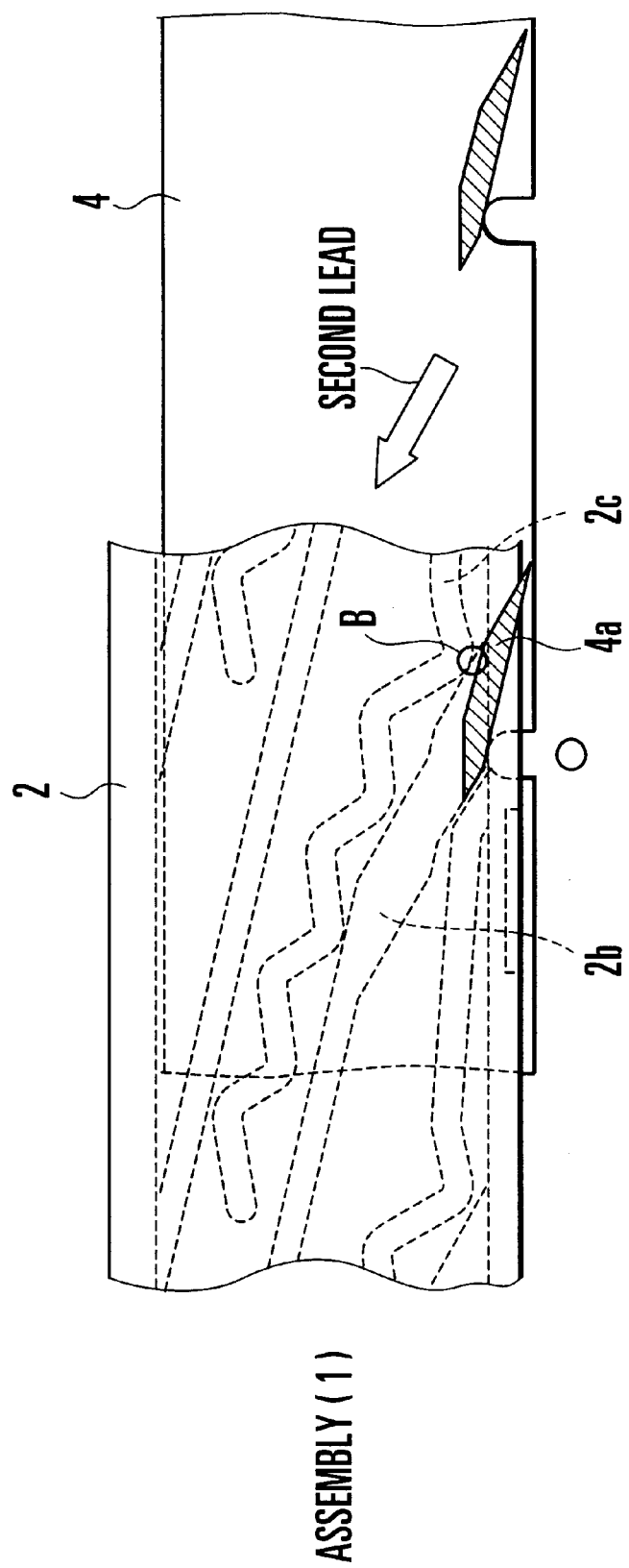
FIG. 8 is a development view showing the cam tube also as in process of assembly.

FIG. 4 shows a state obtained when the lens barrel is at its stowage position. FIG. 6 shows a state obtained with the lens barrel at a wide-angle position. FIG. 5 shows a state obtained when the lens barrel comes to an intermediate position in moving from the stowage position toward the wide-angle position, in which leads of the composite helicoid are changed over. FIGS. 7 and 8 show not the ordinary driving state of the lens barrel, but the movement of the front and rear lens unit tubes 4 and 5 taking place when the lens barrel is in process of assembly.

In each of FIGS. 4 to 8, thick arrows indicate the movable direction and the size of a lead (inclination) of the front lens unit tube 4 with respect to the cam tube 2. As to the composite male helicoid 4a of the front lens unit tube 4, points at which change-over takes place between the first male helicoid and the second male helicoid are respectively indicated as X and Y.

The stowage state shown in FIG. 4 is first described. In this state, the front lens unit tube 4 is helicoid-coupled at the helicoid faces 4d and 4e in the neighborhood of the point Y and at the point X of the composite male helicoid 4a. The length of coupling in this state is short in view of the total length of the composite male helicoid. However, the short coupling length brings about no problem as no force is expected to be exerted on the whole lens barrel in the stowage state.

With the whole lens barrel beginning to be drawn out, the state of FIG. 4 changes into a state of FIG. 5 which is obtained with the lens barrel set at the wide-angle position. During this process, the helicoid coupling of the second male helicoid face 4e of the front lens unit tube 4 and the second female helicoid face 2f of the cam tube 2 causes the front lens unit tube 4 to be drawn out with the second lead given thereto.

Change-over of leads takes place in the state of FIG. 5. After the change-over, the front lens unit tube 4 is caused to be drawn out by the helicoid coupling of the first male helicoid face 4d and the first female helicoid face 2e of the cam tube 2 with the first lead.

At the time of change-over of leads, the two male helicoid faces 4d and 4e are helicoid-coupled with the two female helicoid faces 2e and 2f of the cam tube 2 on the side of the point X. On the side of the other point Y, however, coupling contact is made only at the point Y. However, this state is obtained only for a very short period before the lens barrel is set at the wide-angle position. Since the probability of having any force exerted on the lens barrel during this short period is very low, this transient state brings bout no problem.

With the front lens unit tube 4 further drawn out, the state of FIG. 5 changes into the state of FIG. 6 which is a wide-angle position setting state. After this state, a drawing-out action on the front lens unit tube 4 required for ordinary photo-taking is arranged to be carried out by helicoid-coupling the first helicoid faces 4d and 2e with each other. This arrangement is provided because, compared with the simple screw coupling, a coupling play more readily occurs at the change-over point between the first lead and the second lead in a case where the cam tube 2 and the front lens unit tube 4 are formed by molding a plastic material. It is important to prevent such a coupling play from taking place within a zoom driving range for which the optical performance of the lens is important.

Another reason for the above-stated arrangement lies in that, after the ordinary zoom driving, the whole lens barrel might be left in a drawn-out state. While the lens barrel is left in the drawn-out state, some external force might happen to be exerted on the lens barrel. In view of this, the present embodiment is arranged to increase the strength of the helicoid coupling by increasing the length of the first male helicoid face 4d of the composite male helicoid 4a of the front lens unit tube 4.

FIGS. 7 and 8 show another advantage of the lens barrel in connection with assembly work. The composite female helicoid 2b of the cam tube 2 is in such a shape, near the assembling end of the front lens unit tube 4, that facilitates assembly work.

In the stowage state shown in FIG. 4, the front lens unit tube 4 has already been completely drawn in with the second lead. Therefore, it might be simply considered to be possible to detach the front lens unit tube 4 from the cam tube 2. However, if the second female helicoid face 2f which gives the second lead extends to the assembling end, it comes to interfere with the cam groove 2c at the point A shown in FIG. 7.

To solve this problem, the present embodiment is arranged as follows. The front lens unit tube 4 which has the composite male helicoid 4a is moved with the first lead from the position of FIG. 4 up to the position of FIG. 7. However, if the front lens unit tube 4 is moved up to the assembling end continuously with the first lead, the front lens unit tube 4 comes to interfere with the adjoining cam groove 2c at a point B shown in FIG. 8. After the state of FIG. 7, therefore, the movement with the first lead is changed over to the movement with the second lead. By virtue of this change-over of leads, the composite helicoid 4a can be moved up to the assembling end without interfering with the cam groove 2c.

According to the arrangement of the present embodiment as described above, the helicoids formed in the cam tube 2 and the front lens unit tube 4 for helicoid coupling respectively include two helicoid faces continuously arranged to give different leads. In moving the front lens unit tube 4, the leads are changed serially from one over to the other. The helicoid coupling is thus arranged to behave in the same manner as the ordinary cam coupling between a cam pin and a cam groove and yet to couple the cam tube 2 with the front lens unit 4 with adequate strength. The present embodiment is arranged to use the helicoid coupling in combination with cam coupling. Although both the cam coupling and the helicoid coupling are used, the arrangement of the invention permits forming the cam tube 2 to be thinner than the conventional cam tube and thus permits reduction in diameter of the whole lens barrel.

If the change-over of leads is infinitely carried on, the composite helicoid becomes a curved female helicoid 2g as shown in FIG. 9 and thus infinitely comes closer to cam coupling. However, the composite male helicoid 4a then comes to be in contact with the female helicoid 2g only at the points X and Y. In that state, the advantage of strong coupling attainable by the face engagement of helicoid coupling would be lost. The change-over of leads is, therefore, must be arranged to be repeated minimum necessary times. Further, a normal zoom driving action is preferably performed with a single lead for the reason mentioned in the foregoing.

In the case of the embodiment disclosed, the cam groove 2c is formed in the cam tube 2. According to the invention, however, the cam tube may be formed to have a so-called end-face cam.

According to the arrangement of the embodiment disclosed, in the cam tube having both a female helicoid and a cam, the female helicoid is formed as a composite female helicoid to have two helicoid faces which are arranged to give different leads. The lead to be given to the front lens unit tube is thus arranged to be changed appositely from one lead over to the other lead. The lens barrel according to the invention has the following advantages.

(i) The cam tube, which must be formed to have a thickness for three elements according to the conventional arrangement, can be formed in accordance with the invention to have a thickness only for two elements. This permits reduction in outside diameter of the lens barrel.

(ii) While using such a driving method as cam coupling, i.e., a drawing-out driving method whereby the lens barrel is drawn out in a nonlinear manner for the rotation of the cam tube, a high degree of coupling strength can be obtained by virtue of helicoid coupling. Further, the arrangement of the invention obviates the necessity of setting an additional part such as a cam pin.

Further, the arrangement for performing helicoid driving with only one of the different leads for an ordinary zoom driving region effectively suppresses rattling which takes place at the time of change-over of leads, so that an optical performance required can be accurately retained.

With the composite helicoid having different leads, the arrangement for performing ordinary zoom driving with one of the helicoid having a larger coupling amount (a larger screw engagement part), the structural arrangement of the lens barrel becomes stronger against external forces.

The cam and the female helicoid can be arranged near to each other while avoiding their interference with each other by arranging the cam to be in a shape having recessed and protruding parts alternately recurring, in the optical axis direction, and by forming the continuing part between the first and second female helicoid parts in the neighborhood of a part where the cam is in the recessed shape on the side of the female helicoid. Such an arrangement permits reduction in size of the cam tube in the optical axis direction.

What is claimed is:

1. A lens barrel comprising:
   a cam tube having a female helicoid and a cam formed in an inner wall thereof;
   a first tube which holds a lens and has a male helicoid formed on an outer wall thereof to engage said female helicoid, said first tube being arranged to be moved in an optical axis direction by rotation of said cam tube; and
   a lens holding member which holds a lens and has a cam pin provided thereon for engaging said cam, said lens holding member being arranged to be moved in the optical axis direction by a cam action of rotation of said cam tube,
   wherein said female helicoid and said cam of said cam tube respectively have loci which are continuous and uninterrupted without interfering with each other, and wherein said female helicoid is a composite female helicoid composed of a first female helicoid part and a second female helicoid part which is formed continuously from said first female helicoid part and has a lead different from a lead of said first female helicoid part, and said male helicoid of said first tube is a composite male helicoid composed of first and second male helicoid parts which are capable of face-engaging said first and second female helicoid parts of said female helicoid.

2. A lens barrel according to claim 1, wherein said cam is formed in a groove-like shape having a bottom.

3. A lens barrel according to claim 1, wherein said cam of said cam tube is formed in a shape alternately recessed and protruding in the optical axis direction, and a continuing part between said first and second female helicoid parts is formed in the neighborhood of the recessed part of said cam on the side of said female helicoid.

4. A lens barrel according to claim 1, wherein said first female helicoid part is arranged to move said first tube in the optical axis direction for magnification varying and focusing actions, and said second female helicoid part is arranged to move said first tube for an action other than the magnification varying and focusing actions.

5. A lens barrel according to claim 4, wherein the action other than the magnification varying and focusing actions is a stowing action.

6. A lens barrel according to claim 1, wherein the length of an engaging part where said first male helicoid part engages said first female helicoid part is greater than the length of an engaging part where said second male helicoid part engages said second female helicoid part.

7. A lens barrel according to claim 1, further comprising a fixed tube which is helicoid-coupled with said cam tube at an outer wall of said cam tube, and said cam tube is moved in the optical axis direction with respect to said fixed tube by rotation of said cam tube.

8. A camera comprising a lens barrel according to claim 1.

9. A lens barrel comprising:
   a cam tube having a female helicoid and a cam formed in an inner wall thereof;

a first tube which has a male helicoid formed on an outer wall thereof to engage said female helicoid, said first tube being arranged to be moved in an optical axis direction by rotation of said cam tube; and a lens holding member which holds a lens and has a cam pin provided thereon for engaging said cam, said lens holding member being arranged to be moved in the optical axis direction by a cam action of rotation of said cam tube, wherein said female helicoid has a first female helicoid face and a second female helicoid face, and said male helicoid of said first tube has first and second male helicoid faces which are capable of face-engaging said first and second female helicoid faces of said female helicoid.

10. A lens barrel according to claim 9, wherein a speed at which said first tube moves in the optical axis direction when said first female helicoid face and said first male helicoid face are face-engaged is different from a speed at which said first tube moves in the optical axis direction when said second female helicoid face and said second male helicoid face are face-engaged.

11. A lens barrel according to claim 9, wherein said female helicoid and said cam have respectively continuous loci without interfering with each other.

12. A lens barrel according to claim 9, wherein rotation of said cam tube causes a change from a state in which said first female helicoid and said first male helicoid are face-engaged to a state in which said first female helicoid and said first male helicoid are not face-engaged but said second female helicoid and said second male helicoid are face-engaged, whereby said first tube moves to the optical axis direction.

* * * * *